United States Patent
Fahlenkamp et al.

(10) Patent No.: US 7,312,597 B2
(45) Date of Patent: Dec. 25, 2007

(54) ACTUATION CIRCUIT FOR A SWITCH IN A SWITCH-MODE CONVERTER FOR IMPROVING THE RESPONSE TO SUDDEN CHANGES

(75) Inventors: Marc Fahlenkamp, Geretsried (DE); Martin Feldtkeller, Munich (DE)

(73) Assignee: Infineon Technologies AG, Munich (DE)

( * ) Notice: Subject to any disclaimer, the term of this patent is extended or adjusted under 35 U.S.C. 154(b) by 226 days.

(21) Appl. No.: 11/192,976

(22) Filed: Jul. 28, 2005

(65) Prior Publication Data

US 2006/0031736 A1    Feb. 9, 2006

(30) Foreign Application Priority Data

Jul. 28, 2004    (DE)    ................. 10 2004 036 522

(51) Int. Cl.
   *G05F 1/10*    (2006.01)
(52) U.S. Cl. ........................... 323/222; 323/286
(58) Field of Classification Search ................ 323/222, 323/286, 287
   See application file for complete search history.

(56) References Cited

U.S. PATENT DOCUMENTS

| | | | |
|---|---|---|---|
| 5,485,077 A | * | 1/1996 | Werrbach .................... 323/286 |
| 5,502,370 A | | 3/1996 | Hall et al. |
| 5,565,761 A | | 10/1996 | Hwang |
| 5,581,450 A | | 12/1996 | Walne |
| 5,596,264 A | | 1/1997 | Bichler et al. |
| 5,619,405 A | | 4/1997 | Kammiller et al. |
| 5,973,516 A | | 10/1999 | Bremner et al. |
| 6,069,470 A | | 5/2000 | Feldtkeller |
| 6,140,777 A | | 10/2000 | Wang et al. |
| 6,504,349 B2 | * | 1/2003 | Jaworski ..................... 323/280 |

FOREIGN PATENT DOCUMENTS

DE    44 22 066 C1    2/1996

(Continued)

OTHER PUBLICATIONS

Williams, "Design of Feedback Loop in Unity Power Factor AC to DC Converter", IEEE, 1989, pp. 959-967, (9 pages).

(Continued)

*Primary Examiner*—Shawn Riley
(74) *Attorney, Agent, or Firm*—Maginot, Moore & Beck

(57) ABSTRACT

An actuation circuit is provided for a switch controlling the power consumption in a switch-mode converter which has input terminals for applying an input voltage and output terminals for providing an output voltage. The actuation circuit comprises a first input for supplying a voltage measurement signal which is dependent on the output voltage, an error signal generation circuit which generates an error signal by comparing the voltage measurement signal with a reference signal, a filter arrangement which is supplied with the error signal and which generates a first control signal, and an actuation signal generation circuit which is supplied with the first control signal and which provides an actuation signal for the switch on the basis of the first control signal. The filter arrangement comprises a first filter with an integrating response which generates a first filter signal on the basis of the error signal, a second filter which generates a second filter signal from the error signal in accordance with a hysteresis characteristic, and a combinational logic circuit which generates the first control signal from the first and second filter signals.

20 Claims, 7 Drawing Sheets

FOREIGN PATENT DOCUMENTS

| | | |
|---|---|---|
| DE | 197 25 842 A1 | 1/1999 |
| EP | 0 757 429 A1 | 2/1997 |
| WO | WO 02/093983 A1 | 11/2002 |

OTHER PUBLICATIONS

"High Performance Power Combi Controller", Data Sheet, TDA 16888, Infineon Technologies, Feb. 2000, pp. 1-14, (14 pages).

"Boost Controller, TDA4863, Power Factor Controller IC for High Power Factor and Low THD", Infineon Technologies AG, Data Sheet, V1.0, May 2003, pp. 1-26, (26 pages).

Frank, "TDA 4863—Technical Description AN-PFC-TDA 4863-1", Infineon Technologies AG, Application Note, V1.2, Oct. 2003, pp. 1-26, (26 pages).

* cited by examiner

ACTUATION CIRCUIT FOR A SWITCH IN A SWITCH-MODE CONVERTER FOR IMPROVING THE RESPONSE TO SUDDEN CHANGES

FIELD

Disclosed herein is an actuation circuit for a switch-mode converter and particularly for a switch-mode converter with a power factor correction function (Power Factor Controller, PFC).

BACKGROUND

A switch-mode converter having such an actuation circuit is described in DE 197 25 842 A1, for example. The switch-mode converter described in this publication is used as a power factor correction circuit (Power Factor Controller, PCF), that is to say is used to convert an AC voltage into a DC voltage with a drawn current which is proportional to that of the AC voltage.

An example of an actuation circuit for a switch controlling the power consumption in a PFC circuit is the integrated chip of type TDA4863 from Infineon Technologies AG, Munich, which is described in "Boost Controller TDA 4683, Power Factor Controller IC for High Power and Low THD", Data Sheet, V 1.0, Infineon Technologies AG, May 2003. The application of this integrated chip in a power factor correction circuit is described in "TDA—Technical Description AN-PFC-TDA 4863-1", Application Note, V1.2, Infineon Technologies AG, October 2003. A further actuation circuit for a switch in a step-up converter used in a PFC circuit is the integrated chip TDA 16888 from Infineon Technologies AG, Munich, which is described in the data sheet TDA 16888, 2000-02-28, Infineon Technologies AG, Munich.

On account of the demanded proportionality between the input voltage and the input current, the waveform of the power consumption in power factor correction circuits follows the waveform of the square of the input voltage. With a sinusoidal input voltage, the waveform of the power consumption is in sine squared form. This sine-squared power consumption at the input of the PFC circuit is contrasted by a constant drawn power at the output of the switch-mode converter when there is a constant load. In this context, a capacitor provided at the output of the PFC circuit serves as a buffer store which equalizes the difference between the time-variable power consumption at the input and the constant drawn power at the output and which ensures that the ripple in the power consumption causes only a slight ripple in the output voltage. This capacitor is a significant cost factor and therefore needs to be proportioned to be as small as possible, but this results in increased ripple in the output voltage.

The DC voltage generated by the switch-mode converter needs to assume a prescribed nominal value regardless of the load to which the DC voltage is supplied. A discrepancy between the output voltage and the nominal value appears when the average power transmitted differs from the power drawn by the load. So as always to be able to match the average power consumption to the drawn power, switch-mode converters have, in adequately known fashion, a voltage control loop or power control loop with a feedback loop via which information about the present value of the output voltage is fed back to the actuation circuit in order to be able to adjust the actuation of the switch controlling the power consumption in the event of load changes and an associated change in the output voltage. This feedback loop generates an error signal which is a measure of the discrepancy between the present value of the output voltage and the nominal value.

In principle, PFC circuits are subject to the requirement that the output voltage or the power consumption needs to be corrected as quickly as possible when there are changes in the load connected to the output, but the output voltage ripple existing for the reasons explained above must not adversely affect control.

To reduce any influence by the output voltage ripple on the control response, the feedback loop normally contains a control amplifier with an integrating response. This amplifier provides a control signal in which the error signal is integrated, so that cyclically recurring fluctuations in the error signal have negligible influence on the value of the control signal. However, the integration of the error signal means that such a system reacts slowly to sudden load changes, i.e. to abrupt changes in the load connected to the output. A sudden drop in the output voltage when there is an increase in the power drawn by the load can be regarded, from the point of view of the risk of damage to the switch-mode converter, as less critical than a sudden rise in the voltage when there is a decrease in the power drawn by the load, known as load shedding.

To avoid destroying the PFC circuit in the event of load shedding, actuation circuits for switches in PFC circuits are known which turn off the PFC circuit upon detection of an overvoltage. Hence, in the actuation chip TDA16888 explained above, a function is provided which linearly limits the power consumption of the switch-mode converter when the voltage applied to the output is 10% above the nominal value. If the voltage applied to the output is 20% above the nominal value, the switch-mode converter is immediately turned off and is not turned on again until the output voltage has fallen to the extent that it is now only 10% above the nominal value.

DE 44 22 066 C1 describes a circuit arrangement for limiting the output voltage of a clocked voltage controller in which an increase in the power consumption by the integrating control amplifier is evaluated as an indication of a load current having arisen in order to limit the switch-mode controller linearly without delay upon detection of such a sudden load change.

U.S. Pat. No. 5,581,450 and U.S. Pat. No. 5,619,405 respectively disclose switch-mode converters in which the gain of a control amplifier providing a control signal which is dependent on the output voltage assumes a first or a second gain value, depending on the extent to which the output voltage from the switch-mode converter differs from a nominal value, in order to be able to react quickly to sudden load changes as a result.

U.S. Pat. No. 5,502,370 and U.S. Pat. No. 5,565,761 respectively describe switch-mode converters in which the gain of an OTA (Operational Transconductance Amplifier) provided in the voltage feedback loop has a gain which is dependent on an output current from the switch-mode converter.

In addition, U.S. Pat. No. 6,140,777 fundamentally discloses the practice of producing the voltage control loop in a switch-mode converter in digital form using a digital signal processor (DSP) or a microcontroller.

SUMMARY

It would be advantageous to provide an actuation circuit for a switch controlling the power consumption in a switch-mode converter, particularly in a switch-mode converter which has a power factor correction function, which gives rise to an improved response by the switch-mode converter when reacting to sudden load changes at the output of the switch-mode converter.

The inventive actuation circuit for a switch controlling the power consumption in a switch-mode converter which has input terminals for applying an output voltage and output terminals for providing an output voltage comprises:

- a first input for supplying a voltage measurement signal which is dependent on the output voltage,
- an error signal generation circuit which generates an error signal by comparing the voltage measurement signal with a reference signal,
- a filter arrangement which is supplied with the error signal and which generates a first control signal,
- an actuation signal generation circuit which is supplied with the first control signal and which provides an actuation signal for the switch on the basis of the first control signal.

In line with the invention, the filter arrangement in this actuation circuit comprises the following features:

- a first filter with an integrating response which generates a first filter signal on the basis of the error signal,
- a second filter which generates a second filter signal from the error signal in accordance with a hysteresis characteristic,
- a combinational logic circuit which generates the first control signal from the first and second filter signals.

The second filter adds a signal component to the first filter signal from the integrating filter in order to improve the response of the switch-mode converter when reacting to sudden load changes. In this case, the first filter signal and the second filter signal are combined either additively or multiplicatively, and in the first case the feedback loop preferably contains a third filter which is connected downstream of the combinational logic circuit and which has an exponential response.

In this case, the second filter signal is preferably provided at least approximately without delay, which is to be understood below to mean that changes in the error signal affect the second filter signal with a delay time of no more than 0.5 ms.

The second filter signal is generated by the second filter preferably such that the second filter signal does not influence the first control signal until the magnitude of the error signal exceeds a prescribed threshold. The value of this threshold may be chosen to be different for positive and negative arithmetic signs of the error signal. If the second filter signal assumes a level which differs from a quiescent value when this threshold is exceeded, the output signal from the second filter remains at this level which has been reached even when the magnitude of the error signal subsequently becomes smaller again. A reduction in the second filter signal from this level which has been reached does not take place until the magnitude of the error signal falls below a prescribed second threshold, which may be dependent on the level reached.

The quiescent value of the second filter signal is zero in the case of an embodiment in which the first and second filter signals are combined additively, and is one in the case of an embodiment in which the first and second filter signals are combined with one another multiplicatively.

In a first embodiment of the actuation circuit, provision is made for the first filter and the second filter to be supplied with the error signal directly.

A further improvement in the response when reacting to sudden load changes at the output is achieved in a second embodiment in which the second filter is supplied with the error signal directly and in which the first filter is supplied with a signal which contains the error signal as a first signal component and contains the weighted output signal from the second filter as a second signal component.

To generate the actuation signal for the switch controlling the power consumption, the actuation signal generation circuit is supplied not only with the first control signal, which is dependent on the output voltage, in the case of a switch-mode converter with a power factor correction function, but preferably also with a second control signal which is dependent on an input current for the switch-mode converter and with a third control signal which is dependent on an input voltage for the switch-mode converter.

BRIEF DESCRIPTION OF THE DRAWINGS

The present invention is explained in more detail below using exemplary embodiments with reference to figures.

In the figures, identical reference symbols denote the same circuit components and signals with the same meaning, unless stated otherwise.

DETAILED DESCRIPTION

Figure 1:
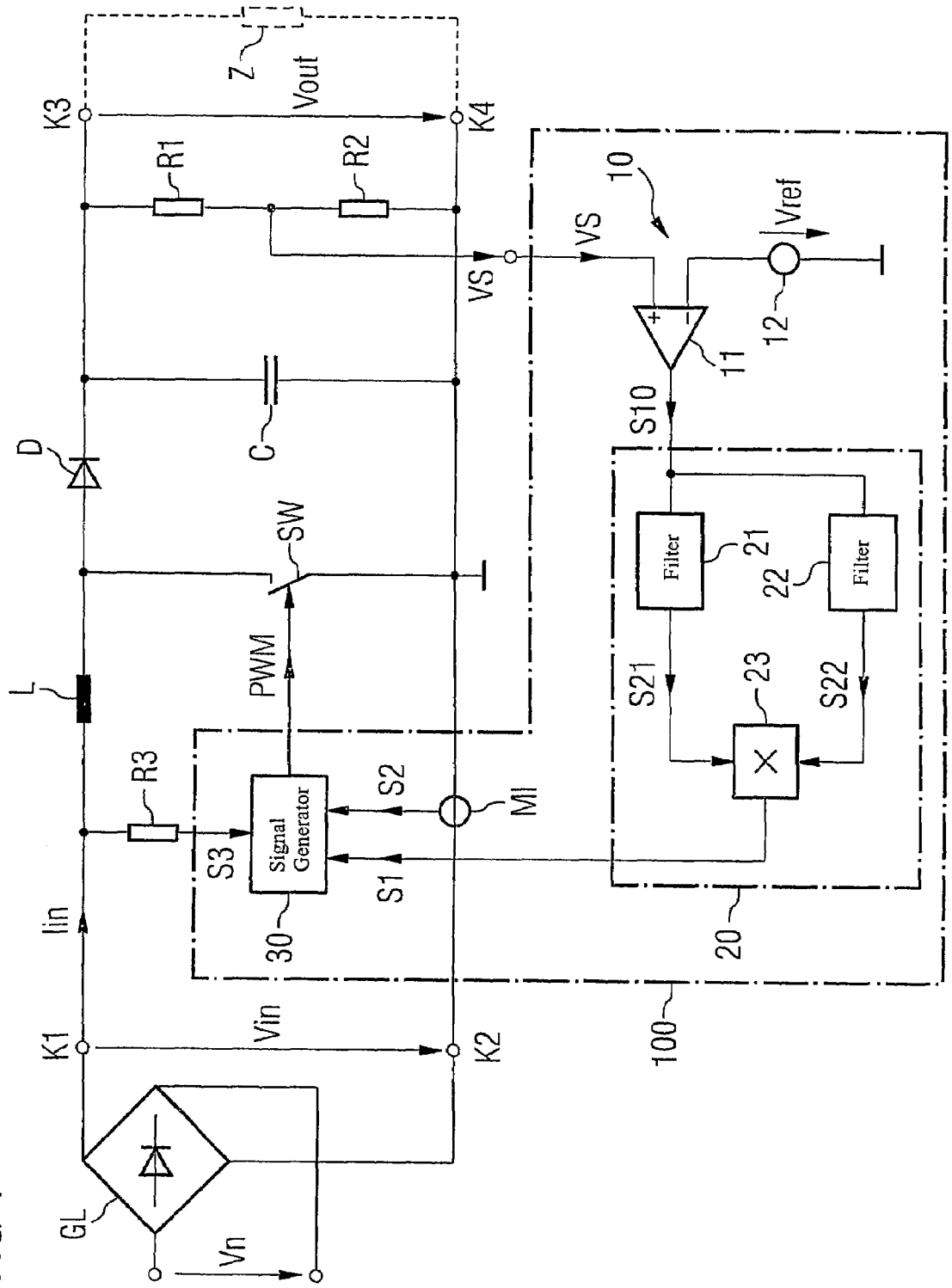
FIG. 1 shows a switch-mode converter, in the form of a step-up converter, with an actuation circuit for a switch controlling the power consumption in line with a first exemplary embodiment.

FIG. 1 shows a first exemplary embodiment of an actuation circuit 100 for a switch SW controlling the power consumption in a switch-mode converter. To improve understanding of the way in which the actuation circuit 100 works, the fundamental circuit components of the switch-mode converter are likewise shown in FIG. 1, these being explained in brief below.

The switch-mode converter shown is in the form of a step-up converter with a power factor correction function and comprises input terminals K1, K2 for applying an input voltage Vin which, in the example, is generated by a bridge rectifier GL from an AC voltage, for example a mains AC voltage Vn. In the case of a sinusoidal mains voltage Vn, the input voltage Vin has a waveform with a sinusoidal magnitude. The step-up converter has an inductive storage element L, for example a storage inductor, and a switch SW, the inductive storage element L and the switch SW being connected up such that when the switch SW is closed the inductive storage element L is in parallel with the input terminals K1, K2. Connected in parallel with the switch SW, there is a series circuit comprising a rectifier element D, for example a diode, and a capacitive storage element C, for example a capacitor. In this circuit arrangement, when the switch SW is closed, the inductive storage element L accepts power via the input terminals K1, K2 and, when the switch SW is open, outputs a portion of this power via the diode D to the output capacitor C or to a load Z (shown in dashes) which can be connected to the output terminals K3, K4. An output voltage Vout can be tapped off across the output capacitor C or between the output terminals K3, K4.

To actuate the switch SW, the actuation circuit 100 comprises an actuation signal generation circuit 30, which generates a pulse-width-modulated actuation signal PWM for the switch SW on the basis of a first control signal S1. This first control signal S1 is available at the output of a feedback loop and is dependent on the output voltage Vout from the switch-mode converter.

For the step-up converter shown, it is true that the power consumption is higher the longer the switch SW is turned on per actuation period length. The pulse-width-modulated actuation signal PWM is generated by the actuation signal generation circuit 30 such that the pulse width of the pulse-width-modulated actuation signal PWM increases in order to increase the power consumption of the switch-mode converter when the first control signal S1 indicates an output voltage Vout which is too low in comparison with a nominal value, and that the pulse width of the actuation signal PWM decreases in order to reduce the average power consumption when the first control signal S1 indicates an output voltage Vout which is too high in comparison with the nominal value. In addition, the actuation is performed such that a mean value for the input current Iin for the switch-mode converter is proportional to the input voltage Vin.

Actuation signal generation circuits 30 which satisfy such functionality are sufficiently well known, which means that there is no need for a detailed description of the design here. Actuation signal generation circuits 30 in PFC circuits take account not only of the first control signal S1 which is dependent on the output voltage Vout but also of the present value of the input current Iin and of the present value of the input voltage Vin, in order to obtain an average input current which is proportional to the input voltage Vin through suitable actuation of the switch SW. The information about the present value of the input current Iin is supplied to the actuation signal generation circuit 30 in the exemplary embodiment in the form of a second control signal S2 which is generated by a current measuring arrangement MI, and the information about the present value of the input voltage Vin is supplied to the actuation signal generation circuit 30 via a nonreactive resistor R3 in the form of a third control signal S3.

An actuation signal generation circuit, which generates a pulse-width-modulated output signal for a switch controlling the power consumption in a power factor correction circuit from a first control signal which is dependent on an output voltage, a signal which is dependent on the input current and a third signal which is dependent on the input voltage, is described in the data sheet for the chip TDA16888 explained at the outset, for example. U.S. Pat. No. 5,619,405 or DE 197 25 842 A1, which are explained at the outset, also describe such actuation signal generation circuits which generate a pulse-width-modulated actuation signal for a switch in a step-up converter from a control signal which is dependent on the output voltage, a signal which is dependent on the input voltage and a signal which is dependent on the input current. Turn-on or turn-off times for the switch are prescribed in these actuation circuits by an internal clock signal generator, whereas the turn-on periods are dependent on the comparison between a ramp signal and a threshold signal formed from the input voltage signal and the first control signal by multiplication.

Turn-on or turn-off times for the switch may also be derived (not illustrated in more detail) from the magnetization state of the storage inductor L, this being described in U.S. Pat. No. 6,140,777, for example.

In addition, it should be noted that the information about the present value of the input voltage does not necessarily have to be ascertained by measuring the input voltage, but rather can also be ascertained in another way, for example from the input current's ramp-like waveform after the switch SW is closed. It is also not absolutely necessary to detect the input current Iin, depending on the specific refinement of the actuation signal generation circuit 30.

However, a common feature of all of the different refinements of the actuation signal generation circuit 30 is that it needs a first control signal S1 which is dependent on the output voltage in order to generate the pulse-width-modulated actuation signal PWM for control the power consumption.

In the actuation circuit 100 based on the invention, this control signal S1 which is dependent on the output voltage is generated from an error signal S10 by a filter arrangement 20 which comprises a first filter 21 and a second filter 22, whose filter output signals S21, S22 are logically combined by a combinational logic circuit 23 to form the first control signal S1.

In the exemplary embodiment, the error signal S10 is provided by an error signal generation circuit 10. This error signal generation circuit 10 has a differential amplifier 11 whose one input is supplied with a voltage measurement signal Vs which is proportional to the output voltage Vout and whose other input is supplied with a reference voltage Vref generated by a reference voltage source 12. The voltage measurement signal Vs is available at a center tap on a voltage divider R1, R2 connected between the output terminals K3, K4. In the present case, it is assumed that the error signal S10 and hence the first control signal S1 rise when the output voltage exceeds the nominal value, in order to limit the power consumption using the actuation signal generation circuit 30, and fall when the output voltage drops below the nominal value, in order to boost the power consumption using the actuation signal generation circuit 30.

It goes without saying that the actuation signal generation circuit may also be in a form such that it limits the power consumption when the control signal S1 is decreasing. In this case, the inputs of the differential amplifier 11 need to be swapped around for generating the first control signal, i.e. the positive input needs to be supplied with the reference signal Vref and the negative input needs to be supplied with the measured signal Vs. In addition, the characteristics also explained in FIGS. 3 and 4 each need to be rotated through 180° in this case.

The first filter 21 has an integrating response, which means that a first filter signal S21 applied to the output of this filter 21 is dependent on an integral, formed over a prescribed period of time, for the error signal S10. Preferably, the first filter 21 is in a form such that the first filter signal S21 has not only this integrative signal component but also a signal component which is proportional to the error signal S10.

The second filter 22 generates a second filter signal S22 from the error signal S10 taking into account a hysteresis characteristic, which will be explained below by way of example with reference to FIGS. 3 and 4. The filter output signals S21, S22 are supplied to a combinational logic unit 23, which is in the form of a multiplier 23 in the example shown in FIG. 1 and which multiplies the first filter signal S21 by the second filter signal S22 in order to generate the first control signal S1. The error signal S10 is supplied directly to the first filter 21 and to the second filter 22 in order to generate the filter signals S21, S22 in the exemplary embodiment.

Figure 2:
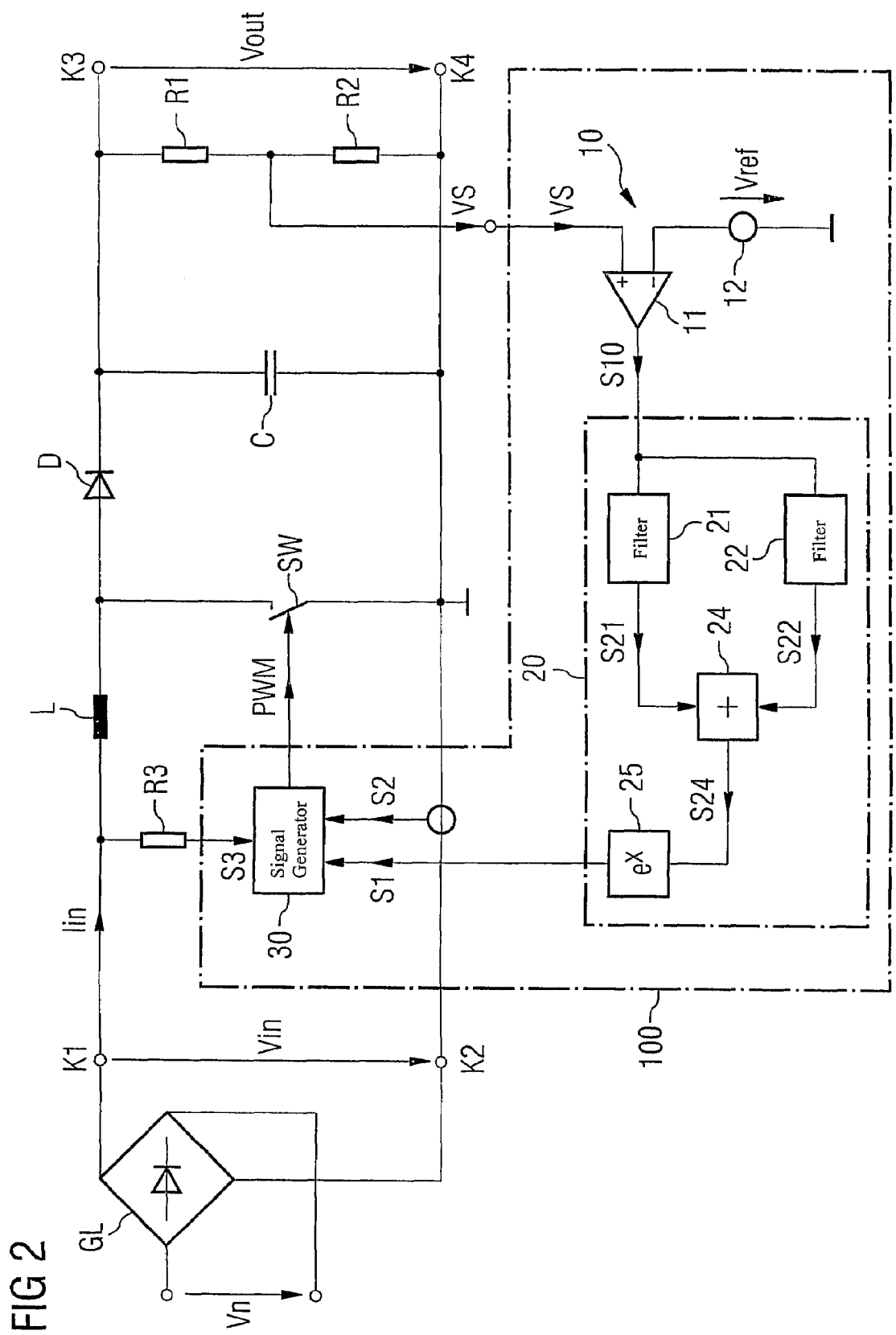
FIG. 2 shows a switch-mode converter with an actuation circuit in line with a second exemplary embodiment of the invention.

FIG. 2 shows a second exemplary embodiment of the inventive actuation circuit 100, in which the feedback loop contains a third filter 25 which has an exponential response. The use of such a filter with an exponential response in the feedback loop of the voltage control loop has already been described in principle in DE 197 25 842 A1, which was explained at the outset, which means that there is no need for further comments regarding the advantages of such a filter. To combine the first and second filter signals S21, S22, this exemplary embodiment contains an adding combinational logic element 24 which adds the first and second filter signals S21, S22 and which supplies the third filter 25, whose output provides the first control signal S1, with an additional signal S24.

The operation of the second filter 22, which generates the second filter signal S22 from the error signal S10, is basically no different than for the exemplary embodiments shown in FIGS. 1 and 2. However, the quiescent value of the second filter in FIG. 1 needs to be distinguished from the quiescent value of the second filter in FIG. 2. In the text below, quiescent value denotes the filter signal values of the second filter 22 at which the second filter 22 has no influence on the first control signal S1. This quiescent value is one for the exemplary embodiment in FIG. 1, in which the first filter signal S21 is multiplied by the second filter signal S22. For the exemplary embodiment in FIG. 2, in which the filter signal values S21, S22 are added to one another before being supplied to the exponential filter 25, the quiescent value of the second filter 22 is zero.

Figure 3:
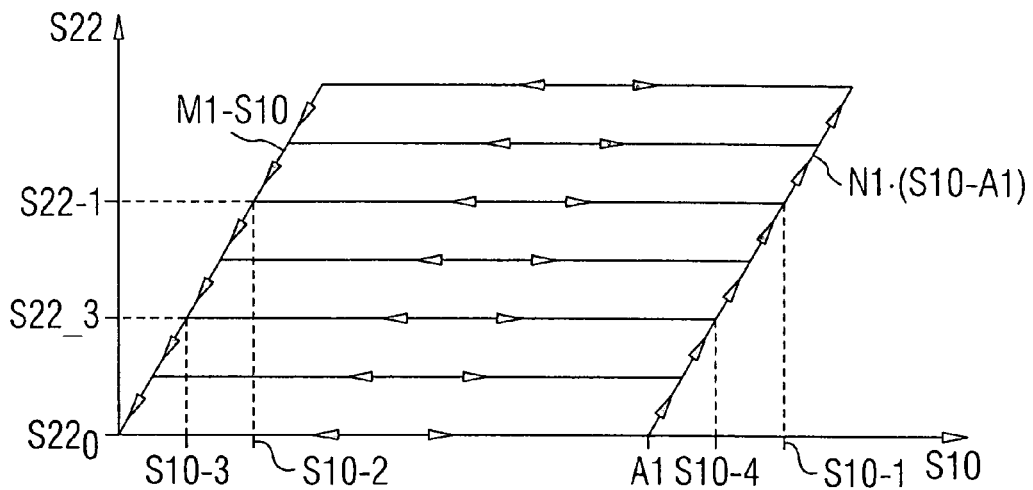
FIG. 3 illustrates a hysteresis-affected response for a filter provided in a feedback loop in the actuation circuit for error signal values greater than zero.

The way in which the second filter 22 works will be better understood from the transfer characteristic for the second filter 22, which is shown in FIG. 3, where the second filter signal value S22 is plotted as a function of the error signal S10 for positive values of the error signal S10. Influence on the first control signal S1 by the second filter 22, provided in addition to the first filter 21, is desirable particularly for positive error signal values S10, since positive error signal values indicate an output voltage Vout which is too high in comparison with the nominal value and hence to excessive power consumption by the switch-mode converter, this power consumption needing to be limited as quickly as possible in order to avoid the risk of destroying the switch-mode converter.

With reference to FIG. 3, the second filter signal S22 assumes a quiescent value $S22_0$ at the start of control, with $S22_0=1$ applying to the first filter 22 shown in FIG. 1 and $S22_0=0$ applying to the second filter 22 in FIG. 2. The second filter signal S22, which is a correction signal for the first filter signal S21, is dependent on the error signal S10 over a hysteresis characteristic. A discrepancy between this second filter signal S22 and the quiescent value $S22_0$ does not arise until the error signal S10 exceeds a positive threshold value A1, and the second filter signal 22 returns toward the quiescent value $S22_0$ after experiencing the hysteresis.

For the rising branch, limiting the hysteresis curve for high error signal values, of the curve, the following is true:

$$S22=N1\cdot(S10-A1) \tag{1}$$

For the falling branch, limiting the hysteresis curve for low error signal values, of the hysteresis curve, the following is true:

$$S22=M1\cdot S10 \tag{2}$$

A drop in the second filter signal S22 from such a value which differs from the quiescent value $S22_0$ does not occur on the hysteresis curve shown until the error signal S10 drops by more than a differential value below a value which has been reached which is greater than the threshold value, this difference subsequently being called hysteresis. This is explained below using an example:

It will be assumed that the error signal S10 rises in the course of the control method from the value zero to a value $S10\_1>A1$, which results in a first correction signal value $S22\_1$ for which the following is true:

$$S22\_1=N1\cdot(S10\_1-A1) \tag{3}$$

If the error signal S10 falls below this maximum error signal value $S10\_1$ which has been reached over the course of time, the second filter signal S22 remains at this level $S22\_1$ which has been reached until the error signal S10 has dropped to an error signal value $S10\_2$, which is on the falling branch of the hysteresis curve and for which the following is true:

$$S10\_2=S22\_1/M1=N1\cdot(S10\_1-A1)/M1 \tag{4}$$

Only when this threshold value is reached does the second filter signal S22 follow the falling branch, indicated by (2), of the hysteresis curve as the error signal value S10 drops further. The difference $S10\_1-S10\_2$ in the example corresponds to the hysteresis, which is dependent on the level $S22\_1$ reached.

When the initially decreasing error signal S10 reaches the one present minimum value, for example the value $S10\_3$, the correction signal S22 on the falling branch reaches a value $S22\_3$, for which the following is true:

$$S22\_3=M1\cdot S10\_3 \tag{5}$$

When the error signal S10 rises again from the present minimum value $S10\_3$ over the course of time, the second filter signal S22 remains, while the error signal S10 is rising, at this initially minimum filter signal value $S22\_3$ reached until the rising error signal S10 exceeds a value $S10\_4$ which is dependent on this minimum level $S22\_3$ and for which the following is true:

$$S10\_4=S22\_3/N1+A1=M1\cdot S10\_3/N1+A1 \tag{6}$$

In the exemplary embodiment shown in FIG. 3, the rising branch and the falling branch of the hysteresis characteristic have a linear shape. Such a characteristic is particularly suitable for the case illustrated in FIG. 2, in which the first filter signal S21 and the second filter signal S22 are added to one another and are supplied to the exponential filter 25. It goes without saying that it is also possible to apply non-linear profiles for the filter signal S22 for a rising or falling error signal S10. The curves for the rising profile and for the falling profile can be chosen such that the hysteresis is of equal magnitude in each case. This can be achieved for the exemplary embodiment in FIG. 3 by virtue of the gradients N1 and M1 of the rising and falling curves each being chosen to be of the same magnitude. In this case, hysteresis denotes the value by which the error signal S10 needs to fall from a maximum value which has been reached before the second filter signal S22 is reduced or by which the error signal S10 needs to rise from a minimum value which has been reached before the second filter signal S22 is increased again.

Figure 4:
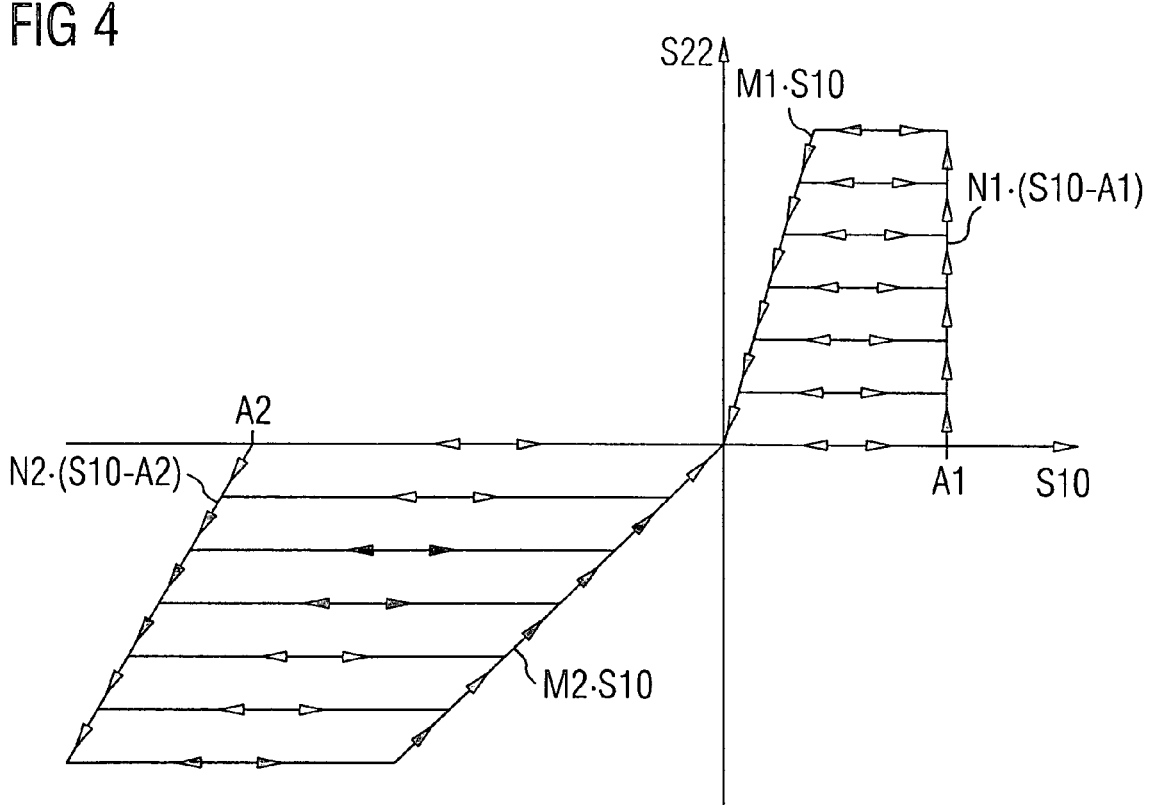
FIG. 4 illustrates a hysteresis-affected response for a filter provided in a feedback loop in the actuation circuit for error signal values greater than and less than zero.

FIG. 4 illustrates a hysteresis-affected transfer characteristic for the second filter 22, which takes into account not only positive error signals but also negative error signals S10. The response of this filter is asymmetrical for positive error signal values and negative error signal values in the example. At positive error signal values S10, the second filter signal S22, which forms a correction signal for the first filter signal S21, thus rises to values differing from the quiescent value S22$_0$ actually when the error signal S10 exceeds a first threshold value A1 whose magnitude is less than the magnitude of a second threshold value A2, after which the correction signal S22 assumes a signal value which differs from the quiescent value at negative error signal values S10. In addition, the rise in the correction signal S22 for positive error signal values S10 is steeper than the rise in the correction signal S22 for negative error signal values. This takes account of the fact that positive error signal values S10 indicate an output voltage which is too high in comparison with the nominal value, which requires a fast reaction in order to limit a further rise in the output voltage. The correction signal S22 therefore rises steeply for error signal values S10 above the first threshold value A1. Negative error signal values S10 indicate an output voltage Vout which is too low in comparison with the nominal value and hence to an excessive load. In this operating state, the system is particularly susceptible to oscillation, which means that careful control is required in this state, which is taken into account by virtue of the correction signal S22 rising only slowly for error signal values below the second threshold value A2 and being limited again only slowly when the error signal becomes larger again. The curves for positive and negative signal values are chosen such that for an error signal value S10 equal to zero the correction signal S22 respectively assumes its quiescent value S22$_0$.

In the example, the transfer characteristic of the second filter is chosen such that a positive correction signal is generated for positive error signal values and a negative correction signal is generated for negative error signal values, the quiescent value S22$_0$ thus being zero. The characteristic in the example has a hysteresis curve for positive error signal values S10. For the rising branch of this curve, the following is true:

$$S22 = N1 \cdot (S10 - A1) \quad (7a)$$

and for the falling branch, the following is true:

$$S22 = M1 \cdot S10 \quad (7b).$$

In addition, the characteristic has a hysteresis curve for negative error signal values S10. For the falling branch of this curve, the following is true:

$$S22 = N2 \cdot (S10 - A2) \quad (8a)$$

and for the rising branch, the following is true:

$$S22 = M2 \cdot S10 \quad (8b).$$

In this context, it is preferable for N1>N2 and M1>M2 to apply.

The gradient N1 for positive error signal values may approach infinity, as a result of which the power consumption would immediately be limited to very low values when the error signal S10 exceeds the limit value. The hysteresis for positive error signal values is preferably greater than that for negative error signal values.

In addition, the rising and falling branches of the hysteresis curves may also have nonlinear profiles. It is thus possible to choose the gradient of these curves on the basis of the discrepancy between the error signal S10 and the respective limit value, that is to say on the basis of the magnitude of S10-A1 or S10-A2.

Figure 5:
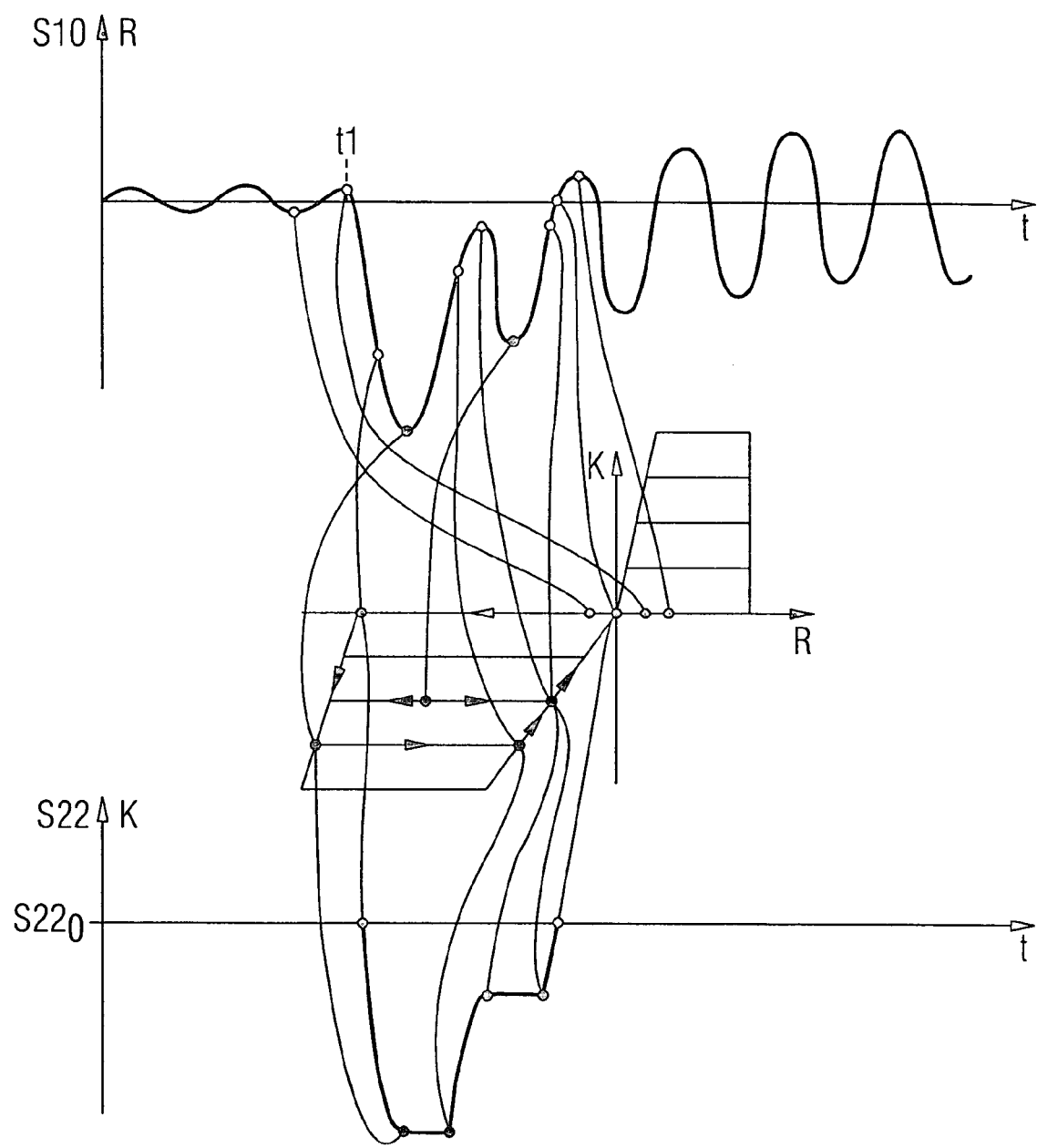
FIG. 5 illustrates an example of the waveform of an error signal which is dependent on the output voltage and of a resultant second filter signal as a function of a transfer characteristic as shown in FIG. 4.

FIG. 5 shows an example of a waveform for the error signal S10 and of a waveform (resulting from this waveform) for the correction signal S22 taking into account the hysteresis curve shown in FIG. 4. The error signal S10 basically has a ripple which results from a ripple in the output voltage Vout which (ripple) exists in PFC circuits. This ripple in the output voltage Vout is obtained, with reference to the explanations given at the outset, from the fact that the power consumption of the PSC circuit follows the square of the input voltage, while the power drawn by a load Z connected to the output is likewise constant at constant load.

In the steady state, the output voltage Vout oscillates around the prescribed nominal value, or the error signal S10 oscillates cyclically around the value zero. In the case of a sinusoidal input voltage, the error signal has a sine-squared profile in the steady state, with the oscillation frequency corresponding to twice the frequency of the input voltage. The amplitude by which the output voltage Vout oscillates around the nominal value is dependent on the mean value of the power consumption and is greater the greater this mean value of the power consumption.

The waveform shown in FIG. 5 starts at a time at which the system is in a steady state with a comparatively small connected load. In this case, the correction signal S22 assumes its quiescent value S22$_0$, which is zero or one depending on the specific exemplary embodiment. The amplitude of the error signal, which has a cyclic profile in the steady state, and the hysteresis of the transfer characteristic of the second filter are matched to one another such that in the steady state at maximum power consumption in the switch-mode converter the positive amplitude is less than the hysteresis of the transfer characteristic for positive error signal values and that the negative amplitude of the error signal is less than the hysteresis of the transfer characteristic for negative error signal values, so that the cyclic profile of the error signal S10 does not result in a correction signal value S10 which differs from the quiescent value on account of the ripple in the output voltage Vout.

In the waveform shown in FIG. 5, a sudden load change occurs at time t1 and increases the drawn power at the output K3, K4 of the switch-mode converter abruptly, so that the output voltage Vout falls at first. As a result, the error signal S10 decreases severely toward negative signal values, but with a basic ripple in the error signal S10 being retained. The fall in the error value signal results in a correction signal value S22 which differs from the quiescent value S22$_0$. This correction signal value is negative for an actuation circuit based on the exemplary embodiment in FIG. 2, in order to correct the first filter signal S21 downward and thereby to reduce the first control signal S1, with this reduction in the first control signal S1 in the actuation signal generation circuit S30 resulting in actuation of the switch SW such that the power consumption is increased. For the exemplary embodiment shown in FIG. 1, the correction signal assumes values between zero and one, so as likewise to correct the first filter signal S21 downward as a result and hence to generate a smaller first control signal S. In this case, the correction signal S21 does not assume its quiescent value S22$_0$ again until the error signal S10 intersects the zero axis again for the first time, which indicates that the transient operation after the sudden load change is largely complete. The greater amplitude of the error signal S10 over the course of time indicates a higher power consumption by the switch-mode converter in comparison with the start. However, this amplitude is, as already explained, too small to influence the value of the first control signal S1 via the second filter 22 in the steady state.

Figure 6:
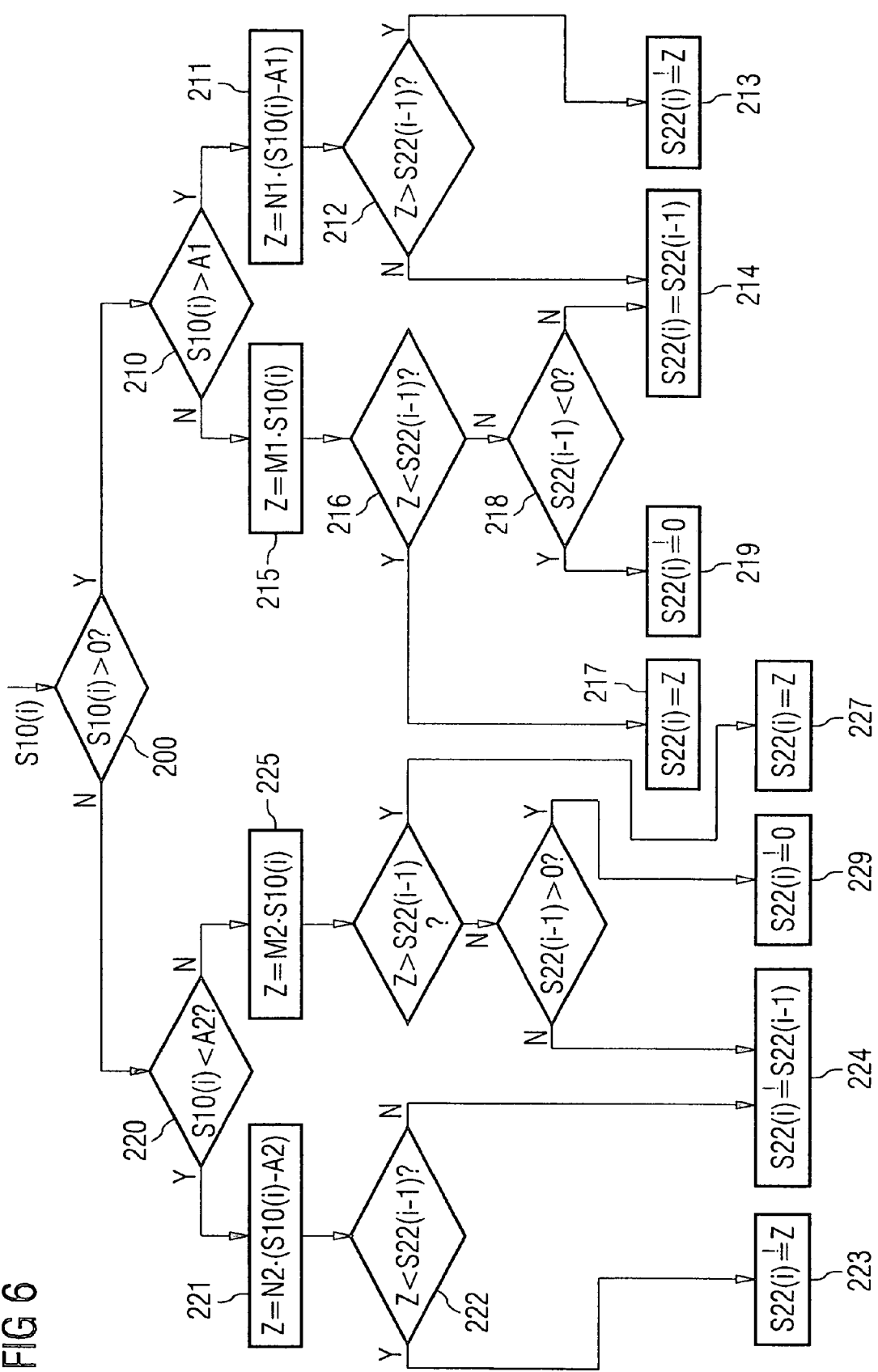
FIG. 6 illustrates an algorithm for generating a second filter signal value from an error signal value.

The second filter 22, which generates a correction signal S22 in the inventive actuation circuit, may be integrated as a digital filter, for example. FIG. 6 illustrates a possible algorithm for ascertaining the correction signal from the error signal. In FIG. 6, S10($i$) denotes a sample of the error signal S10, which sample is used for a present computation step. S22($i$) denotes the correction signal value resulting from this present computation step, and S22($i$-1) denotes the correction signal value ascertained during a preceding computation step.

In a first method step 200, a check is carried out to determine whether the present error signal value S10($i$) is greater than zero. If so, a further method step 210 checks whether the present error signal value S10($i$) is greater than the positive first threshold value A1. If so, the present error signal value S10($i$) is used to ascertain the value on the transfer characteristic's branch rising for positive error signal values and to assign it to a variable Z. If this value assigned to the variable Z is higher than the previously ascertained correction signal value S22($i$-1), which is ascertained in a method step 212, then the present correction signal value S22($i$) is set equal to the value of the variable Z in a method step 213. Otherwise, the correction signal value remains unchanged, that is to say that the present correction signal value S22($i$) is set equal to the previous correction signal value S22($i$-1) in a method step 214.

If the correction signal value S10($i$) is not higher than the first threshold value A1, then in a method step 215 the value on the transfer characteristic's branch falling for positive error signal values S10 is ascertained for the present error signal value S10($i$) and is assigned to the variable Z. If this variable value is lower than the previous correction signal value, which is ascertained in method step 216, then the correction signal value S22($i$) is set equal to the variable value in a method step 217. If the variable value is not lower than the previous correction signal value, then method step 218 checks whether the previous correction signal value S22($i$-1) was less than zero. If so, the present correction signal value S22($i$) is set equal to zero in method step 219, otherwise the correction signal value remains unchanged (step 214).

If the present error signal value S10($i$) is less than zero, a method step 220 is used to ascertain whether the error signal value S10($i$) is below the negative second threshold A2. If so, the transfer characteristic's value situated on the branch falling for negative error signal values is ascertained for this error signal value S10($i$), and is assigned to the variable Z. If the variable turns out to be less than the previous correction signal value S22($i$-1) in a subsequent method step 222, the present correction signal value S22($i$) is set equal to the variable value (step 223), otherwise the correction signal value remains unchanged (method step 224).

If the negative error signal value S10($i$) is greater than the second threshold value A2, the value on the rising branch for negative error signal values in the transfer characteristic is ascertained for this error signal value, and is assigned to the variable Z. If the value ascertained as a result is greater than the previous correction signal value S22($i$-1), then a method step 227 is used to assign the value of this variable Z to the present correction signal value S22($i$). Otherwise, it is ascertained whether the previous correction signal value S22($i$-1) is greater than zero. If so, the present correction signal value S22($i$) is set equal to zero, otherwise the correction signal value remains unchanged (method step 224).

Figure 7:
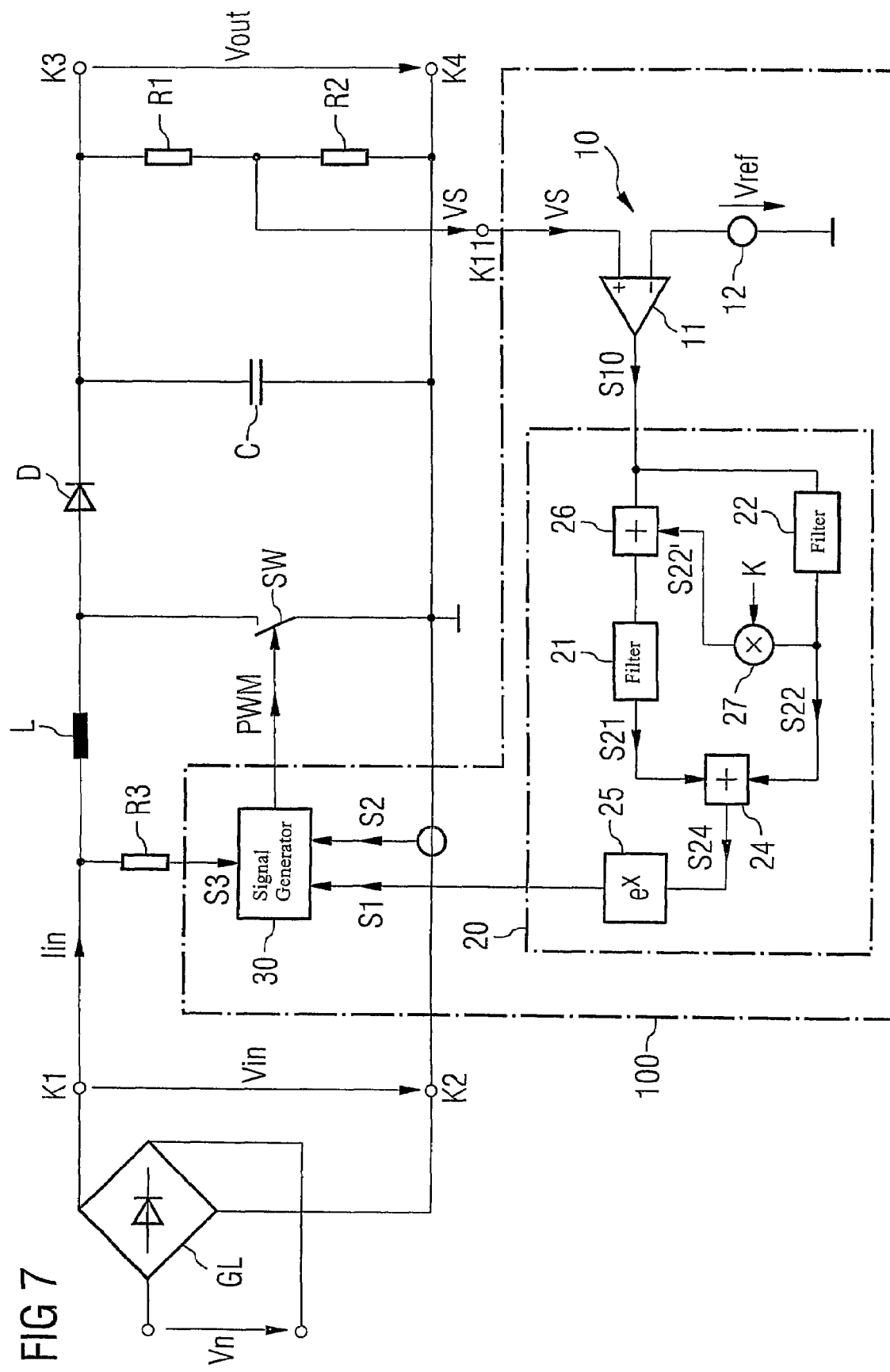
FIG. 7 shows a switch-mode converter with an actuation circuit in line with a further exemplary embodiment of the invention.

FIG. 7 shows a further exemplary embodiment of the inventive actuation circuit, in which the first filter 21 has an adder 26 connected upstream of it, one input of which is supplied with the error signal S10 and the other input of which is supplied with the correction signal S22 weighted with a factor k. The factor k is preferably in the order of magnitude of the reciprocal of one of the gradients N1, M1, N2, M2 of the transfer characteristic explained. In this case, the factor k may also be changed on the basis of the polarity of the error signal S10.

Figure 8:
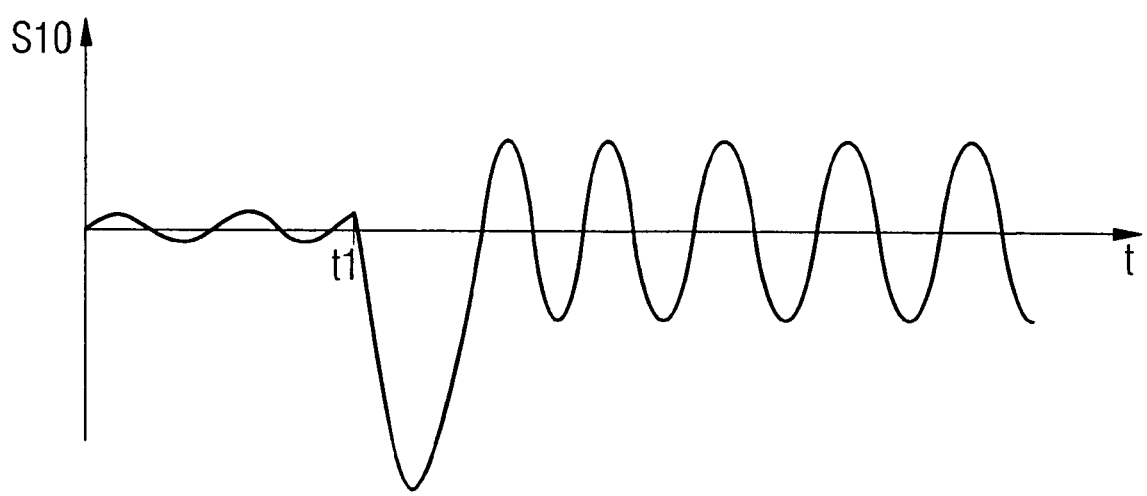
FIG. 8 illustrates an example of the reaction of the switch-mode converter as shown in FIG. 7 to a sudden load change using the waveform of the error signal.

By feeding back the output of the second filter 22 to the input of the first filter 21, it is possible to achieve a further improved response for the switch-mode converter when reacting to sudden load changes at the output K3, K4. The waveform of the error signal S10 in the event of a sudden load change is shown in FIG. 8 for the exemplary embodiment shown in FIG. 7.

The invention claimed is:

1. An actuation circuit for a switch that controls the power consumption in a switch-mode converter, the switch-mode converter having input terminals for applying an input voltage and output terminals for providing an output voltage, the actuation circuit comprising:
   an error signal generation circuit configured to generate an error signal based on a reference signal and a voltage measurement signal, the voltage measurement signal dependent on the output voltage,
   a filter arrangement including a first filter having an integrating response and configured to generate a first filter signal from the error signal and a second filter configured to generate a second filter signal from the error signal in accordance with a hysteresis characteristic, the filter arrangement configured to generate a first control signal based on the first filter signal and the second filter signal,
   an actuation signal generation circuit configured to generate a switch actuation signal based at least in part on the first control signal, the actuation signal generation circuit adapted to provide the switch actuation signal to the switch.

2. The actuation circuit as claimed in claim 1, wherein the filter arrangement further comprises a multiplier operably coupled to receive the first filter signal and the second filter signal.

3. The actuation circuit as claimed in claim 1, wherein the filter arrangement further comprises an adder configured to receive the first and second filter signals and a third filter, connected downstream of the adder, having an exponential response and configured to generate the first control signal.

4. The actuation circuit as claimed in claim 1, wherein the first filter is coupled to receive an input signal which is dependent on the error signal and on the second filter signal.

5. The actuation circuit as claimed in claim 4, wherein the filter arrangement further comprises an additive combinational logic element configured to logically combine the error signal and a signal which is proportional to the second filter signal in order to generate the input signal for the first filter.

6. The actuation circuit as claimed in claim 1, wherein:
the second filter is configured such that the second filter signal has a value which differs from a quiescent value if a magnitude of the error signal exceeds a prescribed threshold value, and
the second filter is configured such that the second filter signal changes from a signal level which has been reached which differs from the quiescent value toward the quiescent value only if the error signal has dropped by a differential value below a previous value which led to the signal level being reached.

7. The actuation circuit as claimed in claim 6, wherein the prescribed threshold value is chosen to be different for positive and negative error signal values.

8. The actuation circuit as claimed in claim 6, in which the differential value is chosen to be different for positive and negative signal values of the error signal.

9. The actuation circuit as claimed in claim 6 wherein the differential value is dependent on the signal level which has been reached for the second filter signal.

10. The actuation circuit as claimed in claim 6, wherein the second filter is configured such that:
if the magnitude of the error signal is increasing then the discrepancy between the signal level of the second filter signal and the quiescent value is dependent on the difference by which the error signal exceeds the prescribed threshold value.

11. The actuation circuit as claimed in claim 10, wherein the second filter is configured such that if the magnitude of the error signal is decreasing then the reduction in the discrepancy between the signal level of the second filter signal and the quiescent value is dependent on the reduction in the error signal.

12. The actuation circuit as claimed in claim 6 wherein the second filter is configured such that the second filter signal is re-set to the quiescent value if the error signal changes arithmetic sign.

13. An arrangement for use in a step-up converter, comprising:
a switch controlling the power consumption in the step-up converter;
input terminals for applying an input voltage;
output terminals for providing an output voltage,
a filter arrangement including a first filter having an integrating response and configured to generate a first filter signal from an error signal and a second filter configured to generate a second filter signal from the error signal in accordance with a hysteresis characteristic, the filter arrangement configured to generate a first control signal based on the first filter signal and the second filter signal, the based on a reference signal and a voltage measurement signal that is dependent on the output voltage, and an actuation signal generation circuit configured to generate a switch actuation signal based at least in part on the first control signal, the actuation signal generation circuit adapted to provide the switch actuation signal to the switch.

14. The arrangement as claimed in claim 13, wherein the filter arrangement further comprises a multiplier operably coupled to receive the first filter signal and the second filter signal.

15. The arrangement as claimed in claim 13, wherein the filter arrangement further comprises an adder configured to receive the first and second filter signals and a third filter, connected downstream of the adder, having an exponential response and configured to generate the first control signal.

16. The arrangement as claimed in claim 13, wherein the first filter is coupled to receive an input signal which is dependent on the error signal and on the second filter signal.

17. The arrangement as claimed in claim 16, wherein the filter arrangement further comprises an additive combinational logic element configured to logically combine the error signal and a signal which is proportional to the second filter signal in order to generate the input signal for the first filter.

18. A method of operating a switch that controls the power consumption in a switch-mode converter which has input terminals for applying an input voltage and output terminals for providing an output voltage, the actuation circuit comprising:
generating an error signal based on a reference signal and a voltage measurement signal that is dependent on the output voltage,
generating a first filter signal from the error signal using a first filter having an integrating response and generating a second filter signal from the error signal in accordance with a hysteresis characteristic using a second filter, t
generating a first control signal based on the first filter signal and the second filter signal,
generating a switch actuation signal based at least in part on the first control signal, the actuation signal generation circuit adapted to provide the switch actuation signal to the switch.

19. The method as claimed in claim 18, further comprising generating the first control signal at least in part by multiplying the first filter signal and the second filter signal.

20. The method as claimed in claim 18, further comprising generating the first control signal by:
adding the first and second filter signals; and
filtering the added first and second filter signals.

* * * * *